(12) United States Patent
Saito et al.

(10) Patent No.: US 7,982,324 B2
(45) Date of Patent: Jul. 19, 2011

(54) POWER GENERATION CONTROL DEVICE

(75) Inventors: Kenjiro Saito, Saitama (JP); Kazumi Shibata, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 465 days.

(21) Appl. No.: 12/235,398

(22) Filed: Sep. 22, 2008

(65) Prior Publication Data

US 2009/0079190 A1 Mar. 26, 2009

(30) Foreign Application Priority Data

Sep. 25, 2007 (JP) ................................ 2007-247867

(51) Int. Cl.
*H02P 9/04* (2006.01)
(52) U.S. Cl. .................................... 290/40 C; 123/51 A
(58) Field of Classification Search .................. 290/40 C
See application file for complete search history.

(56) References Cited

U.S. PATENT DOCUMENTS

| 5,020,491 | A | * | 6/1991 | Mashino | .................... | 123/192.1 |
| 5,608,309 | A | | 3/1997 | Hikita et al. | | |
| 2004/0150233 | A1 | | 8/2004 | Kajiura | | |
| 2007/0261677 | A1 | * | 11/2007 | Bennion | .................... | 123/51 R |

FOREIGN PATENT DOCUMENTS

| EP | 1 102 381 A1 | | 5/2001 |
| JP | 3-212200 A | | 9/1991 |
| JP | 3-504407 A | | 9/1991 |
| JP | 03212200 A | * | 9/1991 |
| JP | 9-140196 A | | 5/1997 |
| JP | 2009089466 A | * | 4/2009 |
| JP | 2010016948 A | * | 1/2010 |
| JP | 2010016949 A | * | 1/2010 |

* cited by examiner

*Primary Examiner* — Joseph Waks
(74) *Attorney, Agent, or Firm* — Birch, Stewart, Kolasch & Birch, LLP

(57) ABSTRACT

A power generation control device for a generator driven by a four-stroke cycle engine is provided. The power generation control device includes a switching circuit for controlling an output current from the generator; and a power generation period control device configured to operate the switching circuit to output the output current from the generator in only a predetermined power generation period of the four strokes of the engine, wherein the power generation period ranges from an expansion stroke to an intake stroke of the four strokes.

14 Claims, 5 Drawing Sheets

POWER GENERATION CONTROL DEVICE

CROSS-REFERENCE TO RELATED APPLICATIONS

This nonprovisional application claims priority under 35 U.S.C. §119(a) on Patent Application No. 2007-247867, filed in Japan on Sep. 25, 2007, the entirety of which is incorporated herein by reference.

BACKGROUND OF THE INVENTION

1. Field of the Invention

The present invention relates to a power generation control device, and more particularly to a power generation control device for controlling power generation so that an output current generated from an engine driven generator can be supplied to a battery and a load in only a predetermined region of the engine strokes where a friction in the engine is low.

2. Background of the Invention

In a vehicle adapted to be driven by an engine, such as a motorcycle and a four-wheel vehicle, a generator adapted to be driven by the engine is provided. A battery for supplying electric power to be used in the vehicle is charged with an output current generated from the generator. Further, in general, an on-vehicle generator selves also as an engine starting motor.

It is known that the amount of the power generation period by an on-vehicle generator is variably controlled according to the load on an engine in the vehicle. For example, JP-A-H3-504407 discloses an AC generator type battery charging method such that a power generation function is stopped when a battery voltage reaches a predetermined level; when a heavy load is applied to an engine, the power generation function of the AC generator is stopped or reduced in spite of the fact that the charged condition of the battery is lower than the predetermined level, thereby preventing a reduction in efficiency of the engine.

Further, Japanese Patent Laid-open No. Hei 3-212200 discloses a device for controlling a field winding current according to an electrical load condition or an operational condition of an automobile, wherein when knocking occurs, the field current in a generator is controlled or stopped.

In the existing power generation control device or charge control device as described in JP-A-H3-504407 and Japanese Patent Laid-open No. Hei 3-212200, the amount of power generation period can be limited when the load on the engine is large, thereby suppressing an increase in engine load. In a four-stroke cycle engine, a friction (a force acting in a direction opposite to the direction of movement of a piston during the operation of the engine from the viewpoint of engine function) differs according to the engine stroke. Accordingly, in the case that the amount of power generation period is controlled only based on the loaded condition of the engine without considering this friction, it is difficult to reduce torque fluctuation due to the friction difference between the strokes.

Particularly in the case that the engine is operated in a low engine speed region, the output torque of the engine is generally low. Accordingly, even though the amount of power generation period is limited, there is a possibility that the engine operation may become unstable due to the torque fluctuation caused by the friction difference between the strokes. In other words, even though the amount of power generation period is controlled according to only the loaded condition of the engine in general, the smoothness of the engine operation cannot be significantly improved.

SUMMARY OF THE INVENTION

It is accordingly an object of the present invention to provide a power generation control device which can smooth the torque particularly in a low engine speed region by controlling the amount of the power generation period in consideration of the friction in each stroke.

In accordance with a first aspect of the present invention, there is provided a power generation control device for a generator adapted to be driven by a four-stoke cycle engine, the power generation control device including a switching circuit for controlling an output current from the generator; and power generation period control means for operating the switching circuit in only a predetermined power generation period in the four strokes of the engine; wherein the power generation period ranges from the expansion stroke to the intake stroke of the four strokes.

In accordance with a second aspect of the present invention, the power generation period is set according to an engine speed of the four-stroke cycle engine such that the lower the engine speed, the more a start point of the power generation period is shifted toward a start point of the expansion stroke and the shorter a length of the power generation period.

In accordance with a third aspect of the present invention, the power generation period is effective only between a predetermined idling speed and a predetermined charge starting speed higher than the idling speed, and the switching circuit is operated in all of the four strokes in an engine speed region higher than or equal to the charge starting speed to thereby perform power generation control in all of the four strokes.

In accordance with a fourth aspect of the present invention, the generator is connected to a battery adapted to be charged by the output current from the generator, and the switching circuit is driven in accordance with a duty so that a terminal voltage of the battery is converged to a predetermined regulated voltage.

In accordance with the first aspect of the present invention, the power generation is performed in only the power generation period set in the range from the expansion stroke to the intake stroke where the friction is low, so that a load due to this power generation is added to the friction in the engine itself. Accordingly, the torque can be made uniform between these strokes where the friction is low and the other stroke where the friction is large, thereby stabilizing an intake efficiency.

In accordance with the second aspect of the present invention, the lower the engine speed, the shorter the range of the power generation period. In particular, power generation is performed in the expansion stroke where the friction is lower. Accordingly, the influence of the load due to the power generation can be minimized and minimum power generation can be performed at the same time. Further, fuel economy can be improved by such minimum power generation.

In accordance with the third aspect of the present invention, the power generation is performed only in a relatively low engine speed region ranging from the idling speed to the charge starting speed. Accordingly, as compared with the case that power generation is performed in a low engine speed region with low torque over the four strokes, an increase in the load due to power generation can be suppressed. Accordingly, the engine operation in the low engine speed region can be stabilized.

In accordance with the fourth aspect of the present invention, in a system for supplying electric power generated from the generator to the battery, charge control of the battery can be performed with reference to the predetermined regulated voltage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
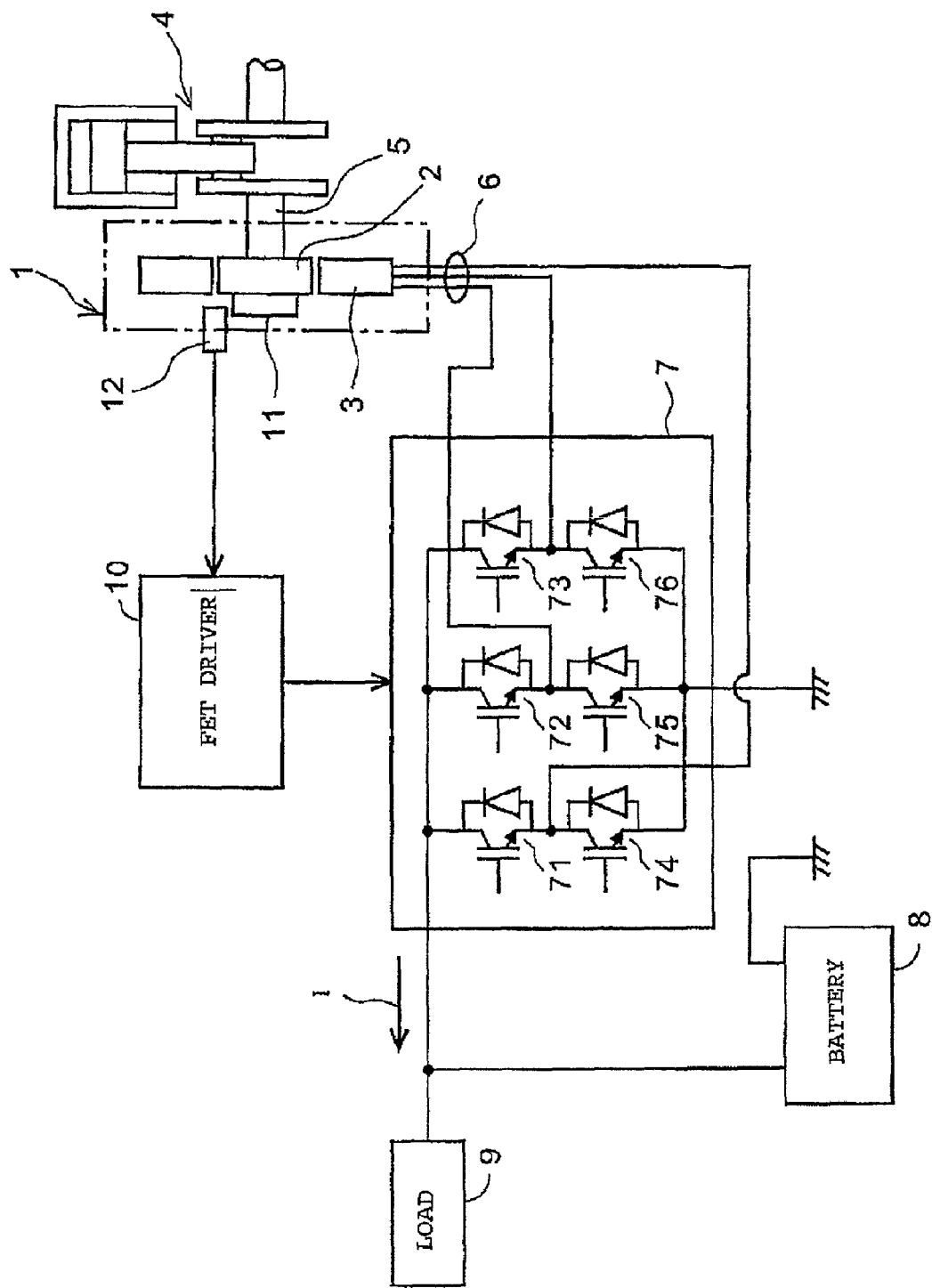
FIG. 1 is a diagram showing a system configuration of a charge control device according to a preferred embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

A preferred embodiment of the present invention will now be described with reference to the drawings. FIG. 1 is a diagram showing a system configuration of a charge control device according to a preferred embodiment of the power generation control device of the present invention.

In FIG. 1, a generator 1 is composed of an inner rotor 2 and an outer stator 3. The inner rotor 2 is connected to one end of a crankshaft 5 of a four-stroke cycle engine 4. The outer stator 3 has a three-phase output winding 6, which is connected to the input side of a switching circuit 7. The output side of the switching circuit 7 is connected to a battery 8 and a load 9. The switching circuit 7 is a three-phase bridge circuit composed of six FETs 71, 72, 73, 74, 75, and 76. An FET driver 10 serves as an output control device for changing the duty phases of the FETs 71 to 76 of the switching circuit 7 to thereby perform duty control.

The inner rotor 2 of the generator 1 is provided with a sensor magnet 11 having a predetermined number of magnetic poles arranged in the circumferential direction thereof. The adjacent magnetic poles have different polarities. A crank angle sensor 12 is opposed to the circumferential surface of the sensor magnet 11. The crank angle sensor 12 is composed of a plurality of magnetoelectric transducers (Hall elements). In this preferred embodiment, the sensor magnet 11 has eight magnetic poles. In other words, the magnetic poles are arranged at 45° intervals. On the other hand, the crank angle sensor 12 has three Hall elements arranged at 15° intervals. These Hall elements successively output detection signals (which will be hereinafter referred to as "pitch signals") at 15° intervals. The detection signals from the Hall elements are input into the FET driver 10.

The FET driver 10 performs switching control in a predetermined stroke of the four strokes of the engine where the friction is low, according to the engine speed, thereby supplying a current I to the battery 8 and the load 9.

Figure 2:
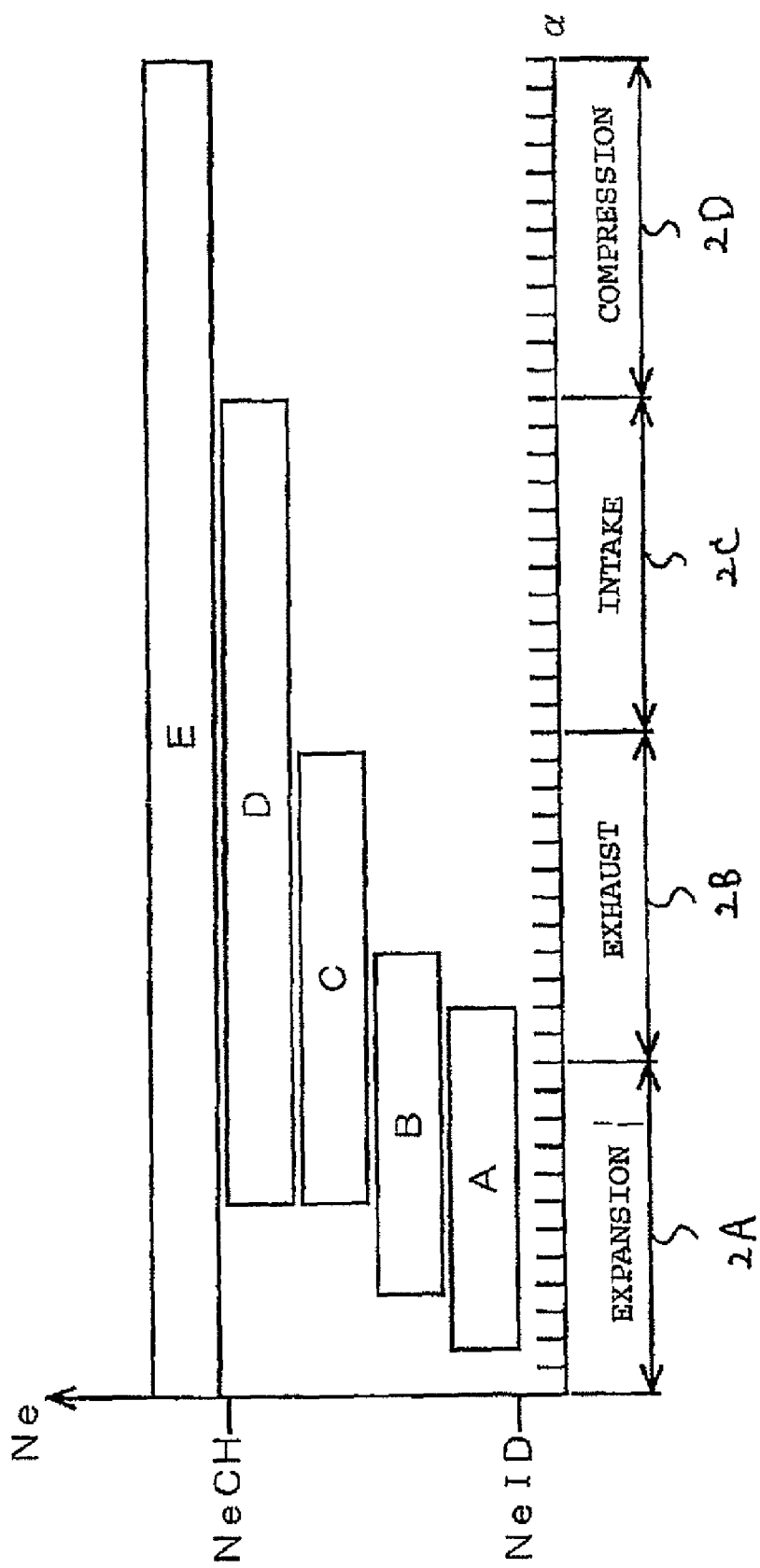
FIG. 2 is a diagram showing the relation between engine speed and charge period according to the preferred embodiment.

The outline of the charge control in this preferred embodiment will now be described with reference to FIG. 2. In FIG. 2, the horizontal axis represents the crank angle a and the vertical axis represents the engine speed Ne. The horizontal axis is provided with a scale marked at 15° intervals in accordance with the output from the crank angle sensor 12. The left end of this scale corresponds to the compression top dead center (top position). When the crankshaft 5 of the engine 4 is rotated, an expansion stroke, an exhaust stroke, an intake stroke, and a compression stroke are successively repeated at 180° intervals from the top position as a start point.

A plurality of charge periods, or power generation periods are shown along this scale in FIG. 2, and these charge periods are different according to the engine speed Ne. More specifically, different charge periods A, B, C, D, and E are set according to the engine speed Ne. The charge period A is set to a range from the initial stage of the expansion stroke to the initial stage of the exhaust stroke (crank angle of 30° to 210°). The charge period B is set to a range slightly delayed from the charge period A (crank angle of 45° to 240°). The charge period C is set to a range from the middle of the expansion stroke to the end of the exhaust stroke (crank angle of 90° to 360°). The charge period D is set to a range from the middle of the expansion stroke to the end of the intake stroke (crank angle of 90° to 540°). In this manner, the charging operation is performed only during the limited charge periods A-D starting from the expansion stroke of the four strokes when the engine speed is between a predetermined idling speed NeID and a predetermined normal charge starting speed NeCH higher than the idling speed NeID. When the engine speed is higher than the normal charge starting speed NeCH, the charge period E is set to a range including all of the four strokes, so that the charge control is performed in all of the four strokes according to the load condition and the battery voltage.

In the expansion stroke, the maximum torque can be obtained by the combustion of fuel in the engine, so that there is a low possibility that the engine speed may become unstable when a load due to power generation is applied to the engine. In the compression stroke, the friction is large and the torque is low, so that the load due to power generation has a large effect on the engine speed. In this preferred embodiment, when the engine speed Ne is less than the normal charge starting speed NeCH, the charging operation is stopped during the compression stroke where the load due to power generation has a large effect on the engine speed, whereas the charging operation may be performed only from the expansion stroke to the intake stroke where the load due to power generation has a small effect on the engine speed.

Figure 3:
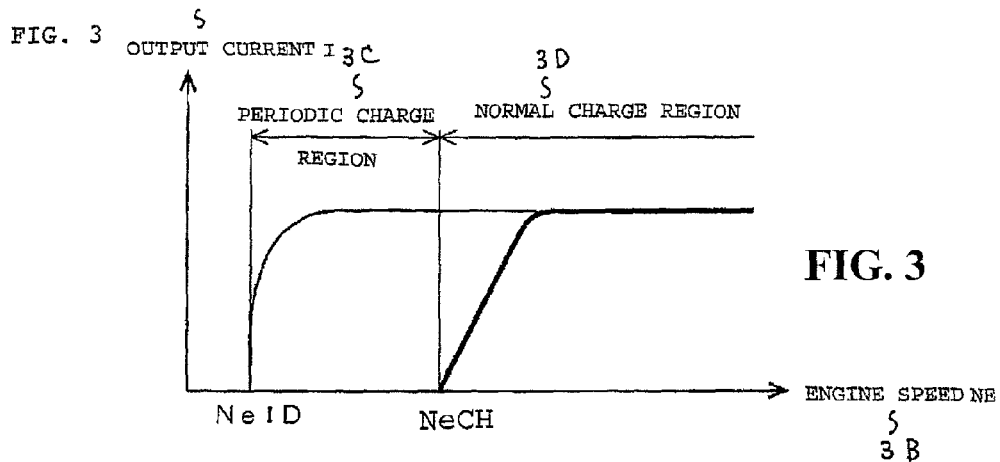
FIG. 3 is a graph showing the output characteristic of a generator.

FIG. 3 is a graph showing the basic output characteristic of the generator 1. In FIG. 3, the horizontal axis represents the engine speed Ne and the vertical axis represents the output current I. As apparent from FIG. 3, when the engine speed Ne reaches the idling speed NeID, the charging operation is started. Until the engine speed Ne reaches the normal charge starting speed NeCH, normal charge is not performed; that is, the charging operation is performed in only the predetermined charge periods as described above with reference to FIG. 2 (which will be hereinafter referred to as "periodic charge"). When the engine speed Ne reaches the normal charge starting speed NeCH, the periodic charge is ended and the charge amount is controlled in all of the four strokes of the engine according to the load condition and the battery voltage. The engine speed region from the idling speed NeID to the normal charge starting speed NeCH is referred to as a periodic charge region, and the engine speed region higher than the normal charge starting speed NeCH is referred to as a normal charge region.

Figure 4:
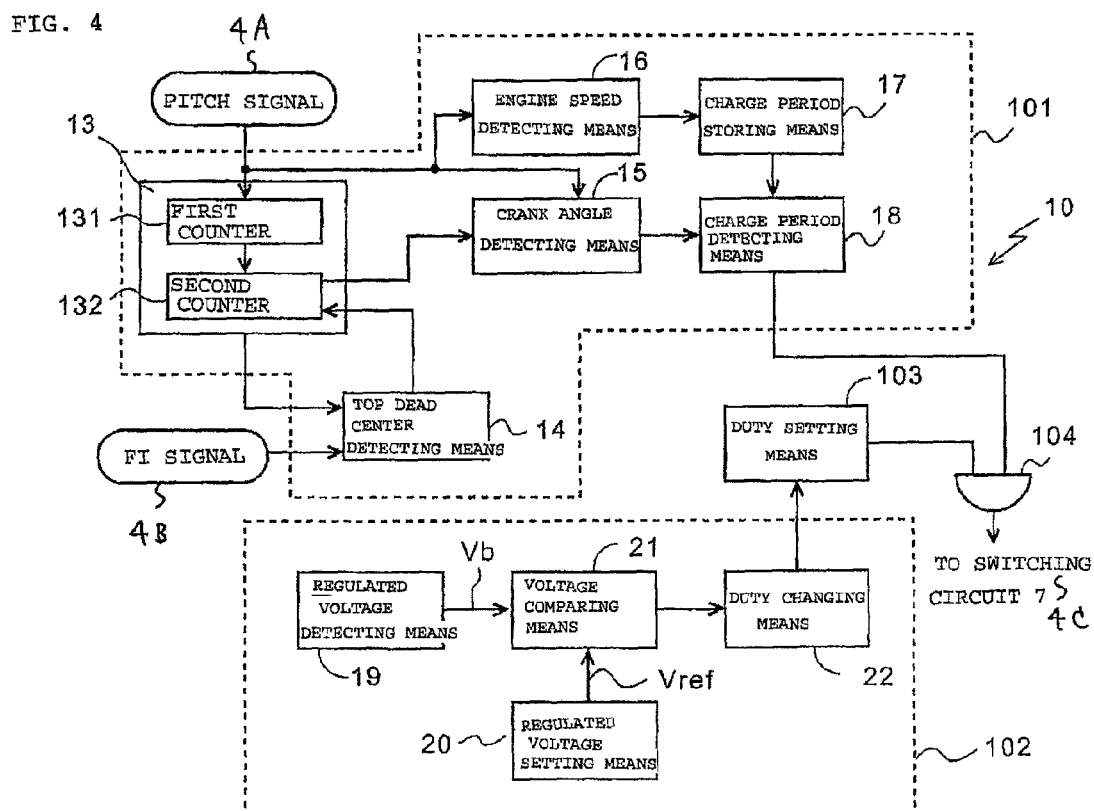
FIG. 4 is a block diagram showing the function of an essential part of an FET driver.

FIG. 4 is a block diagram showing the function of an essential part of the FET driver 10. As shown in FIG. 4, the FET driver 10 includes a charge period control block 101, a regulated voltage control block 102, a duty setting means 103, and an AND gate 104.

The charge period control block 101 includes a mechanical angle counter 13, top dead center detecting means 14, crank angle detecting means 15, engine speed detecting means 16, charge period storing means 17, and charge period determining means 18.

The mechanical angle counter 13 is composed of a first counter 131 for counting pitch signals input at 15° intervals and a second counter 132 incrementing its counter value by one (1) when every six pitch signals are counted by the first counter 131. In other words, the counter value of the second counter 132 is increased by one for every 90° interval. The initial value of the counter value of the second counter 132 is "0", and the maximum value of the counter value of the second counter 132 is "7". Accordingly, the counter value of the second counter 132 is circulated at 720° intervals, i.e., with the cycle of the four strokes of the engine 4.

The top dead center detecting means 14 decides the compression top dead center at the position where the counter value of the second counter 132 is "0". However, the compression top dead center cannot be determined only by the counter value of the second counter 132. In this preferred embodiment, the compression top dead center is determined by the counter value of the second counter 132 and an external signal. As the external signal, an FI signal deciding a fuel injection timing in fuel injection control may be used. The FI signal is output in a predetermined period near the compression top dead center, so as to inject the fuel. Accordingly, when the increment of the counter value of the second counter 132 is detected at the output period of the FI signal, the timing of the increment of this counter value is determined as the compression top dead center. After the compression top dead center is determined, the counter value of the second counter 132 is reset to "0".

The crank angle detecting means 15 detects a crank angle with reference to the compression top dead center according to the counter value from the second counter 132 of the mechanical angle counter 13 and the pitch signals. For example, in the case that three pitch signals are input after the time the counter value "0" is input, the crank angle is detected as 45° (0°+15°×3=45°). In the case that four pitch signals are input after the time the counter value "2" is input, the crank angle is detected as 240° (90°×2+15°×4=240°).

The engine speed detecting means 16 monitors the period of the pitch signals and detects the engine speed Ne determined by this period. The charge period storing means 17 preliminarily stores a table showing the correspondence between the charge periods A to E and the engine speed Ne. Each charge period is set in units of 15°. When receiving an engine speed Ne from the engine speed detecting means 16, the charge period storing means 17 outputs data indicating the charge period corresponding to this engine speed Ne to the charge period determining means 18. The charge period determining means 18 compares the charge period input from the charge period storing means 17 and the crank angle input from the crank angle detecting means 15, and outputs a charge control signal in the case that the crank angle falls within the charge period.

The regulated voltage control block 102 includes regulated voltage detecting means 19, regulated voltage setting means 20, voltage comparing means 21, and duty changing means 22. The regulated voltage setting means 20 preliminarily stores a regulated voltage set value Vref. The regulated voltage set value Vref is a predetermined battery voltage value of 14.5 V. The regulated voltage detecting means 19 detects a present battery voltage Vb as a regulated voltage and outputs it to the voltage comparing means 21. The voltage comparing means 21 compares the regulated voltage set value Vref and the detected voltage value Vb, and outputs the result of comparison to the duty changing means 22.

The duty changing means 22 changes the duty of any one of the FETs according to the result of comparison between the input voltage values Vref and Vb. More specifically, when the detected voltage value Vb is smaller than the regulated voltage set value Vref, the duty is increased, whereas when the detected voltage value Vb is larger than the regulated voltage set value Vref, the duty is decreased. The duty changing means 22 outputs a duty changing signal for increasing or decreasing the duty as mentioned above. The amount of change in the duty may be a fixed value or may be variable according to the deviation of the detected voltage value Vb from the regulated voltage set value Vref. More specifically, when the deviation is large, the amount of change in the duty may be increased, whereas when the deviation is small, the amount of change in the duty may be decreased. The duty changing signal is input into the duty setting means 103. The duty setting means 103 outputs the duty changed above and a drive command for the switching circuit 7 to the AND gate 104.

On the other hand, the charge control signal from the charge period determining means 18 is input as a gate signal into the AND gate 104. Accordingly, while the charge control signal is ON, the duty and the drive command for the switching circuit 7 output from the duty setting means 103 are input into the switching circuit 7. The switching circuit 7 is driven in response to the drive signal output from the duty setting means 103, and a given one of the FETs 71 to 76 is kept on during the phase according to the input duty in accordance with a predetermined switching pattern. While this FET is ON, the current generated in the three-phase output winding 6 of the generator 1 is supplied to the battery 8 and the load 9.

Figure 5:
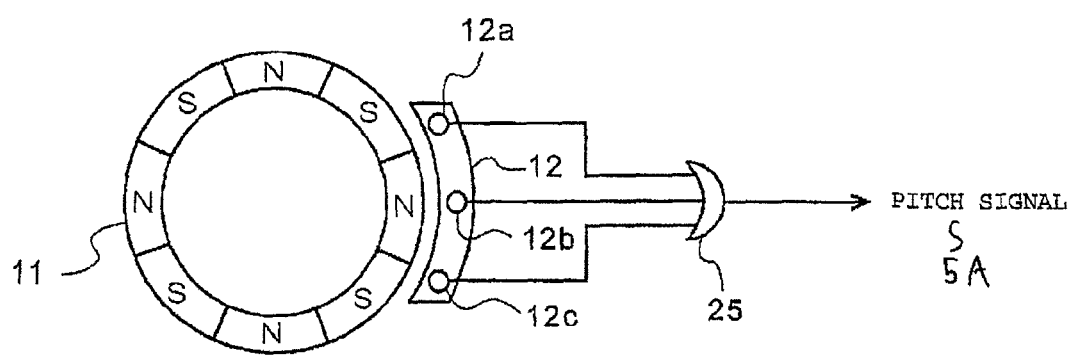
FIG. 5 is a schematic diagram showing the positional relation between a crank angle sensor and a sensor magnet.

FIG. 5 is a schematic diagram showing the positional relation between the crank angle sensor 12 and the sensor magnet 11. As shown in FIG. 5, the sensor magnet 11 is a ringlike permanent magnet, which has a plurality of N poles and S poles alternately arranged at 45° intervals. The crank angle sensor 12 is composed of three Hall elements 12a, 12b, and 12c opposed to the outer circumferential surface of the sensor magnet 11. These three Hall elements 12a, 12b, and 12c are arranged at 150 intervals. Outputs from the Hall elements 12a, 12b, and 12c are input through an OR gate 25 to the first counter 131. In other words, the pitch signals are formed at 15° intervals according to the positional relation between the sensor magnet 11 and the Hall elements 12a to 12c.

Figure 6:
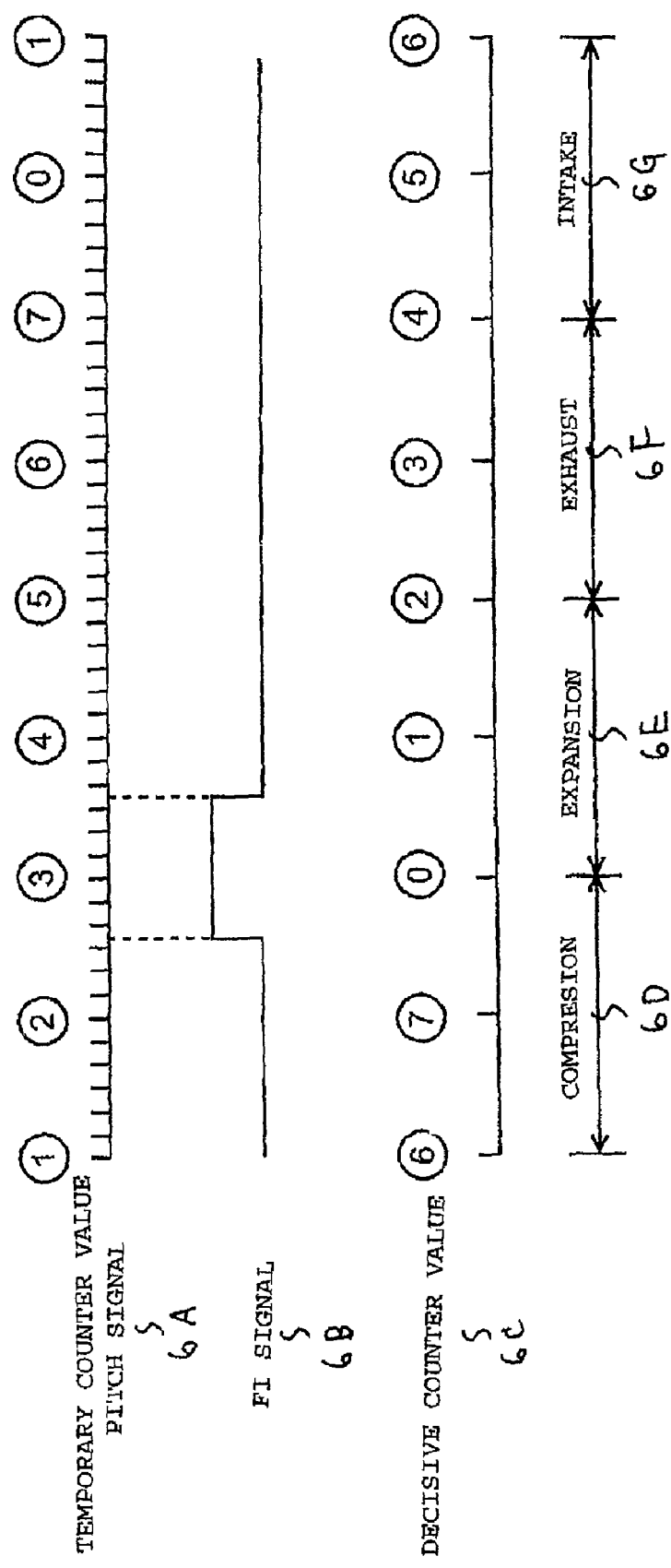
FIG. 6 is a schematic diagram for illustrating the operation of top dead center detecting means.

FIG. 6 is a schematic diagram for illustrating the operation of the top dead center detecting means 14. As shown in FIG. 6, when every six pitch signals are detected (i.e., every mechanical angle of 90° is detected), the counter value of the second counter 132 is incremented by one (1), and this cycle is repeated. Further, while the FI signal is ON, the counter value of the second counter 132 is reset to "0".

More specifically, the temporary counter value prior to resetting shown at the top position in FIG. 6 and the FI signal shown at the middle position in FIG. 6 are put into an AND operation to obtain a decisive counter value shown at the bottom position in FIG. 6. As a result, the counter values 0 to 2 are determined as the expansion stroke, the counter values 2 to 4 are determined as the exhaust stroke, the counter values 4 to 6 are determined as the intake stroke, and the counter values 6 to 0 are determined as the compression stroke.

The switching circuit 7 performs switching of the FETs 71 to 76 in accordance with a predetermined switching pattern to convert the current generated by the generator 1 into a direct current. In a low engine speed region from the idling speed NeID to the normal charge starting speed NeCH, the charging operation is performed in only the charge periods A to D. Accordingly, a masking pattern is preliminarily set in a time period other than the charge periods A to D, and all the FETs 71 to 76 are turned off in this time period to thereby stop the output from the generator 1.

As described above, the charging current is changed according to the engine stroke, resulting in variations in battery voltage. To cope with this problem, the regulated voltage detecting means 19 reads a plurality of voltage values for the battery voltage in each stroke of the engine and detects the average of these voltage values as the battery voltage (regulated voltage). This average may be weighted according to the charge periods A to E. More specifically, when the charging operation is performed in only the charge periods A to D of all the engine strokes, the average is multiplied by a coefficient less than 1.0, whereas when the charging operation is performed in all the engine strokes (the charge period E), the average is multiplied by a coefficient of 1.0.

As described above, the top dead center detecting means 14 detects the top dead center by performing an AND operation between the temporary counter value and the FI signal at 90° intervals to thereby obtain the decisive counter value. As a modification, the top dead center may be determined by calculating an average of the engine speeds at 90° intervals and setting the counter value "0" at the mechanical angle where the difference in this average in all the engine strokes becomes maximum. This modification is suitable for an engine with a carburetor in which the FI signal cannot be obtained.

In this preferred embodiment, the engine strokes are detected and a predetermined region of the engine strokes where the friction is low is set as a charge period. As a modification, the charge period may be made variable in consideration of the load condition. For example, a crank angular velocity in the predetermined region prior to the compression stroke may be detected, and if the crank angular velocity detected above is less than a reference value, it is determined that the load is high, so that the charge period is shortened. More specifically, even though the charge period is set to the charge period D determined by a certain engine speed, for example, the charge period is shortened to stop charging at the end of the exhaust stroke rather than at the end of the intake stroke in the case that the load is determined to be high. In other words, the charge period is changed to the charge period C. Further, even though the charge period is set to the charge period C determined by a lower engine speed, the charge period is shortened to stop charging at the initial stage of the exhaust stroke rather than at the end of the exhaust stroke in the case that the load is determined to be high. In other words, the charge period is changed to the charge period A or B.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power generation control device for a generator driven by a four-stroke cycle engine, the power generation control device comprising:
   a switching circuit for controlling an output current from the generator; and
   a power generation period control device configured to operate the switching circuit to output the output current from the generator in only a predetermined power generation period of the four strokes of the engine,
   wherein the power generation period ranges from an expansion stroke to an intake stroke of the four strokes.

2. The power generation control device according to claim 1, wherein the power generation period is set according to an engine speed of the four-stroke cycle engine such that the lower the engine speed, the more a start point of the power generation period is shifted toward a start point of the expansion stroke and the shorter a length of the power generation period.

3. The power generation control device according to claim 2, wherein:
   the power generation period is effective only when the engine speed is between a predetermined idling speed and a predetermined charge starting speed higher than the idling speed; and
   the switching circuit is operated in all of the four strokes when the engine speed is higher than or equal to the charge starting speed to thereby perform power generation control in all of the four strokes.

4. The power generation control device according to claim 3, wherein the generator is connected to a battery to be charged by the output current from the generator, and the switching circuit is driven in accordance with a duty so that a terminal voltage of the battery is converged to a predetermined regulated voltage.

5. The power generation control device according to claim 2, wherein the generator is connected to a battery to be charged by the output current from the generator, and the switching circuit is driven in accordance with a duty so that a terminal voltage of the battery is converged to a predetermined regulated voltage.

6. The power generation control device according to claim 2, wherein the power generation period is further set according a load connected to the switching circuit such that the higher the load, the earlier an end point of the power generation period occurs.

7. The power generation control device according to claim 6, wherein the generator is connected to a battery to be charged by the output current from the generator, and the switching circuit is driven in accordance with a duty so that a terminal voltage of the battery is converged to a predetermined regulated voltage.

8. The power generation control device according to claim 1, wherein:
   the power generation period is effective only when an engine speed of the four-stroke cycle engine is between a predetermined idling speed and a predetermined charge starting speed higher than the idling speed; and the switching circuit is operated in all of the four strokes when the engine speed is higher than or equal to the charge starting speed to thereby perform power generation control in all of the four strokes.

9. The power generation control device according to claim 1, wherein the generator is connected to a battery to be charged by the output current from the generator, and the switching circuit is driven in accordance with a duty so that a terminal voltage of the battery is converged to a predetermined regulated voltage.

10. A power generation control device for a generator driven by a four-stroke cycle engine, the power generation control device comprising:
   a switching circuit for controlling an output current from the generator; and
   a power generation period control device configured to operate the switching circuit to output the output current in only a predetermined power generation period between an expansion stroke and an intake stroke and to stop outputting the output current during a compression stroke when an engine speed of the four-stroke cycle engine is between a predetermined idle speed and a predetermined charge starting speed.

11. The power generation control device according to claim 10, wherein a start point of the power generation period is located within the expansion stroke, and the start point of the power generation period and a length of the power generation period are based on the engine speed, wherein the lower the engine speed, the earlier the start point of the power generation period occurs and the shorter the length of the power generation period.

12. The power generation control device according to claim 11, wherein the length of the power generation period is further based on a load connected to the switching circuit, and wherein the higher the load, the earlier an end point of the power generation period occurs.

13. The power generation control device according to claim 10, wherein the power generation period control device operates the switching circuit to output the output current during all of the four strokes when the engine speed is higher than or equal to the predetermined charge starting speed.

14. The power generation control device according to claim 10, wherein the generator is connected to a battery to be charged by the output current from the generator, and the switching circuit is driven in accordance with a duty so that a terminal voltage of the battery is converged to a predetermined regulated voltage.

* * * * *